United States Patent
Li et al.

(10) Patent No.: US 12,012,093 B2
(45) Date of Patent: Jun. 18, 2024

(54) VEHICLE DRIVE CONTROL METHOD AND SYSTEM

(71) Applicant: GREAT WALL MOTOR COMPANY LIMITED, Hebei (CN)

(72) Inventors: Yunfei Li, Hebei (CN); Zhiqiang Li, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 243 days.

(21) Appl. No.: 17/790,476

(22) PCT Filed: Apr. 16, 2021

(86) PCT No.: PCT/CN2021/087905
§ 371 (c)(1),
(2) Date: Jun. 30, 2022

(87) PCT Pub. No.: WO2021/209053
PCT Pub. Date: Oct. 21, 2021

(65) Prior Publication Data
US 2023/0045073 A1 Feb. 9, 2023

(30) Foreign Application Priority Data
Apr. 17, 2020 (CN) .......................... 202010307157.4

(51) Int. Cl.
*B60W 20/50* (2016.01)
*B60W 10/06* (2006.01)
(Continued)

(52) U.S. Cl.
CPC ............ *B60W 20/50* (2013.01); *B60W 10/06* (2013.01); *B60W 10/08* (2013.01); *B60W 20/10* (2013.01);
(Continued)

(58) Field of Classification Search
CPC ...... B60W 20/50; B60W 10/06; B60W 10/08; B60W 20/10; B60W 2510/0638;
(Continued)

(56) References Cited

U.S. PATENT DOCUMENTS

| 5,713,814 A | 2/1998 | Hara et al. |
| 6,054,776 A | 4/2000 | sumi |
| 2018/0244261 A1* | 8/2018 | Ruybal ................. B60K 6/387 |

FOREIGN PATENT DOCUMENTS

| CN | 101896390 A | 11/2010 |
| CN | 105620467 A | 6/2016 |

(Continued)

*Primary Examiner* — Yuen Wong
(74) *Attorney, Agent, or Firm* — Nath, Goldberg & Meyer; Joshua B. Goldberg (57) ABSTRACT

The present application relates to the technical field of vehicles and provides a vehicle drive control method and system including: obtaining a state of a generator and/or a drive motor of a hybrid vehicle (S101); determining whether the hybrid vehicle meets conditions for entering a parallel operation mode when the temperature in the state is greater than a safety temperature threshold and/or a fault condition in the state shows that a fault occurs in the generator and/or the drive motor (S102); and controlling the hybrid vehicle to adjust the load distribution of the engine, the generator, and the drive motor in the parallel operation mode when the hybrid vehicle meets the conditions for entering the parallel operation mode, so that the temperature of the generator and/or the drive motor decreases until below the safety temperature threshold and/or there is no fault (S103).

17 Claims, 3 Drawing Sheets

(51) Int. Cl.
*B60W 10/08* (2006.01)
*B60W 20/10* (2016.01)

(52) U.S. Cl.
CPC .............. *B60W 2510/0638* (2013.01); *B60W 2510/087* (2013.01); *B60W 2510/1005* (2013.01); *B60W 2520/10* (2013.01)

(58) Field of Classification Search
CPC ... B60W 2510/087; B60W 2510/1005; B60W 2520/10; B60W 10/11; B60W 2710/0644; B60W 2710/0666; B60W 2710/1005; B60W 20/20; B60W 2710/081; B60W 2710/083; Y02T 10/62
See application file for complete search history.

(56) References Cited

FOREIGN PATENT DOCUMENTS

| | | |
|---|---|---|
| CN | 107683231 A | 2/2018 |
| CN | 109353330 A | 2/2019 |
| CN | 109693662 A | 4/2019 |
| JP | 2012-30686 A | 2/2012 |
| JP | 2012-30762 A | 2/2012 |
| WO | 2013/012379 A1 | 1/2013 |

\* cited by examiner

VEHICLE DRIVE CONTROL METHOD AND SYSTEM

CROSS-REFERENCE OF THE RELATED APPLICATIONS

The present application is the U.S. national phase of International Application No. PCT/CN2021/087905 with an international filing date of Apr. 16, 2021, designating the U.S., now pending, and further claims priority benefits to Chinese Patent Application No. 202010307157.4 filed Apr. 17. 2020. The contents of all of the aforementioned applications, including any intervening amendments thereto, are incorporated herein by reference.

TECHNICAL FIELD

The present application relates to the technical field of vehicles, and more particular to a vehicle drive control method and system.

BACKGROUND

A hybrid electric vehicle involves a combination of traditional internal combustion engine vehicle and pure electric vehicle, and has the advantages of both internal combustion engine vehicle and pure electric vehicle. Most hybrid vehicles have the following three operation modes: pure electric operation mode (engine not working), series operation mode (engine and drive motor working in series), and parallel operation mode (drive motor and motor working in parallel). Different models of vehicles mainly focus on different operation modes.

For series operation mode of vehicles, during the process of vehicle driving, when the generator or the drive motor is over temperature or a fault occurs, its performance will decline. Currently, it is only possible to limit the power output by the drive system of the vehicle to lower the temperature of the generator or the drive motor or to avoid further deterioration of the fault. In this way, the dynamic performance of the vehicle will degrade, and will seriously affect the driving of the vehicle.

SUMMARY

In view of the above, the present application aims to propose a vehicle drive control method to reduce the temperature of the generator or the drive motor or to avoid further deterioration of the fault without affecting the dynamic performance of the vehicle.

To achieve the above purpose, the technical scheme of the present application is realized as follows:

A vehicle drive control method, including: obtaining a performance-related information of a generator and/or a drive motor of a hybrid vehicle; determining whether the hybrid vehicle meets activation conditions of a parallel operation mode when the performance-related information shows that an operating performance of the generator and/or the drive motor degrades; and activating the parallel operation mode of the hybrid vehicle when the hybrid vehicle meets the activation conditions of the parallel operation mode, so that the operating performance of the generator and/or the drive motor is restored to a normal state.

Preferably, the activation conditions of the parallel operation mode are as follows: a parallel target rotation speed of an engine is within a preset parallel rotation speed operating range, and a parallel target torque of the hybrid vehicle is within a parallel torque operating range corresponding to the parallel target rotation speed; or a fault information shows that the generator and/or the drive motor are unable to continue to operate, and the parallel target rotation speed of the engine is within a maximum parallel rotation speed range and the parallel target torque is within a maximum parallel torque range. The maximum parallel rotation speed range and the maximum parallel torque range are configured to respectively reflect a maximum rotation speed range and a maximum torque range that may be output when the engine operates normally in the parallel operation mode, the parallel rotation speed operating range is less than the maximum parallel rotation speed range, and the parallel torque operating range is less than the maximum parallel torque range.

Preferably, the vehicle drive control method further includes: determining the parallel rotation speed operating range and its corresponding parallel torque operating range according to the temperature of the generator and/or the drive motor.

Preferably, the step of determining the parallel rotation speed operating range and its corresponding parallel torque operating range according to the temperature of the generator and/or the drive motor includes: correcting a parallel rotation speed operating efficiency range and its corresponding parallel torque operating efficiency range according to a real-time temperature of the generator and/or the drive motor, so that the parallel rotation speed operating range and its corresponding parallel torque operating range are obtained. The parallel rotation speed operating efficiency range and its corresponding parallel torque operating efficiency range are configured to be obtained when the engine is operating below a safety temperature threshold, and the parallel rotation speed operating range and its corresponding parallel torque operating range are configured to expand as the temperature of the generator and/or the drive motor increases.

Preferably, the vehicle drive control method further includes: obtaining a parallel target gear that reflects a user requirement; and determining the parallel target rotation speed according to the parallel target gear.

Preferably, the step of determining the parallel target rotation speed according to the parallel target gear includes: calculating the parallel target rotation speed based on the following formula: parallel target rotation speed=vehicle speed*transmission ratio. The transmission ratio is configured to be associated with the parallel target gear.

Preferably, after the step of activating the parallel operation mode of the hybrid vehicle, the vehicle drive control method further includes: controlling the hybrid vehicle to adjust a load distribution of the engine, the generator, and the drive motor under the parallel operation mode.

Preferably, the step of controlling the hybrid vehicle to adjust the load distribution under the parallel operation mode includes: controlling a total workload of the hybrid vehicle remains unchanged under the parallel operation mode, and lowering the workload of the generator and/or the drive motor.

The present application further provides a vehicle drive control system. The vehicle drive control system is configured with a controller for executing the above vehicle drive control method.

The present application further provides a computer-readable storage medium on which computer program instructions are stored. The computer program instructions is configured to make a machine to execute the above vehicle drive control method.

The vehicle drive control system and computer readable storage medium have the same advantages of the aforementioned vehicle drive control method over the prior art and will not be described herein.

Other features and advantages of the present application will be explained in detail in the subsequent specific embodiments section.

DESCRIPTION OF THE DRAWINGS

The accompanying drawings constituting a part of the present application are used to provide a further understanding of the present application. The schematic embodiments of the present application and their explanations are used to interpret the present application, but not to constitute an improper qualification of the present application. In the attached figures.

DETAILED DESCRIPTION OF THE EMBODIMENTS

It should be noted that the embodiments in the present application may be combined with each other without conflict.

At present, most of the hybrid vehicles have pure electric drive mode, series operation mode and parallel operation mode. Herein, the pure electric drive mode means the vehicle driving is realized by the coordination of a high voltage battery with a drive motor (the generator only runs after the engine started, so it will not run at this mode), series operation mode means the vehicle driving is realized by series coordinated operation of the engine, the generator, and the drive motor, and parallel operation mode means the vehicle driving is realized by separate operation of the engine, and the generator and the drive motor. Different vehicles have different specific gravities for each mode during operation, some are mainly in series operation mode, and some are mainly in parallel operation mode. In the process of the vehicle driving, when the generator or the drive motor is fault or over temperature, merely by prior art methods of limiting vehicle output power would result in a degradation of the dynamic performance of the vehicle. The present application will combine the parallel operation mode and its triggering timing to ensure the performance safety of the generator or the drive motor without affecting the output load of the vehicle. The scheme of the present application will be described in combination with the following drawings.

Figure 1:
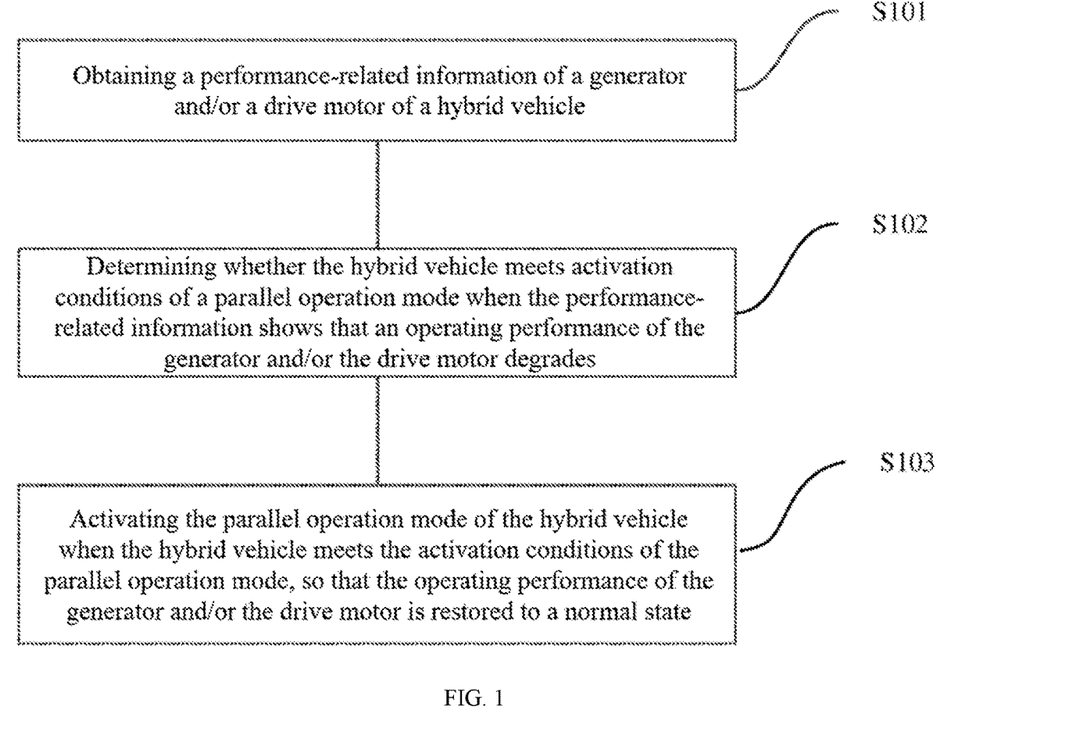
FIG. 1 is a flowchart of the vehicle drive control method according to a embodiment of the present application.

FIG. 1 is a flowchart of the vehicle drive control method. As shown in FIG. 1, the vehicle drive control method includes: steps S101-S103.

In step S101, a performance-related information of a generator and/or a drive motor of a hybrid vehicle is obtained.

The performance-related information includes temperature information and/or fault information. The temperature is the hardware temperature corresponding to the generator and/or the drive motor, which may be collected using a specially designed temperature sensor or by a temperature sensing device already installed on the vehicle. The fault information is used to show whether the fault of the generator and/or the drive motor exists or not, and when a fault occurs, the fault information may show the type of the fault, that is, a fault code, the fault code may be combined with the current vehicle operating conditions to identify the ability of the engine and/or drive motor to continue to operate, or the fault information may be used to determine whether the fault will exacerbate the state deterioration of the generator and/or the drive motor, in which, the state deterioration may be shown as the continued rise of the temperature or a breakdown of the generator and/or the drive motor.

In step S102, it is determined whether the hybrid vehicle meets activation conditions of a parallel operation mode when the performance-related information shows that an operating performance of the generator and/or the drive motor degrades.

The premise for determining the condition of entering the parallel operation mode is that: the temperature of the generator and/or the drive motor exceeds the safety temperature threshold and/or the fault information shows the generator and/or the drive motor is fault, that is, the performance of the generator and/or the drive motor degrades. The safety temperature threshold is configured to show a maximum temperature value at which the generator and/or the drive motor can operate normally, that is, the maximum operating temperature value without performance degradation.

In step S103, the parallel operation mode of the hybrid vehicle is activated when the hybrid vehicle meets the activation conditions of the parallel operation mode, so that the operating performance of the generator and/or the drive motor is restored to a normal state.

The normal state means that the temperature of the generator and/or the drive motor decreases until below the safety temperature threshold and/or there is no fault.

The activation conditions of the parallel operation mode of the hybrid vehicle include any of the following two conditions. The load distribution of the hybrid vehicle is adjusted by the following condition 1 or condition 2 on the basis of ensuring that the engine is able to operate, so that the temperature of the generator and/or the drive motor decreases until below the safety temperature threshold and/or there is no fault, that is, the generator and/or the drive motor is restored to a normal state:

Condition 1: a parallel target rotation speed of an engine is within a preset parallel rotation speed operating range, and a parallel target torque of the hybrid vehicle is within a parallel torque operating range corresponding to the parallel target rotation speed. The parallel rotation speed operating range is used to reflect the rotation speed range of the engine, and the parallel torque operating range is associated with the parallel target rotation speed. The parallel target rotation speed is the rotation speed desired by the user, that is, the user's vehicle performance requirements. In addition, the parallel target torque is not the torque of a motor or engine, but the target torque of the whole vehicle.

Condition 2: the fault information shows that the generator and/or the drive motor are unable to continue to operate, and the parallel target rotation speed of the engine is within a maximum parallel rotation speed range and the parallel target torque is within a maximum parallel torque range.

Figure 2:
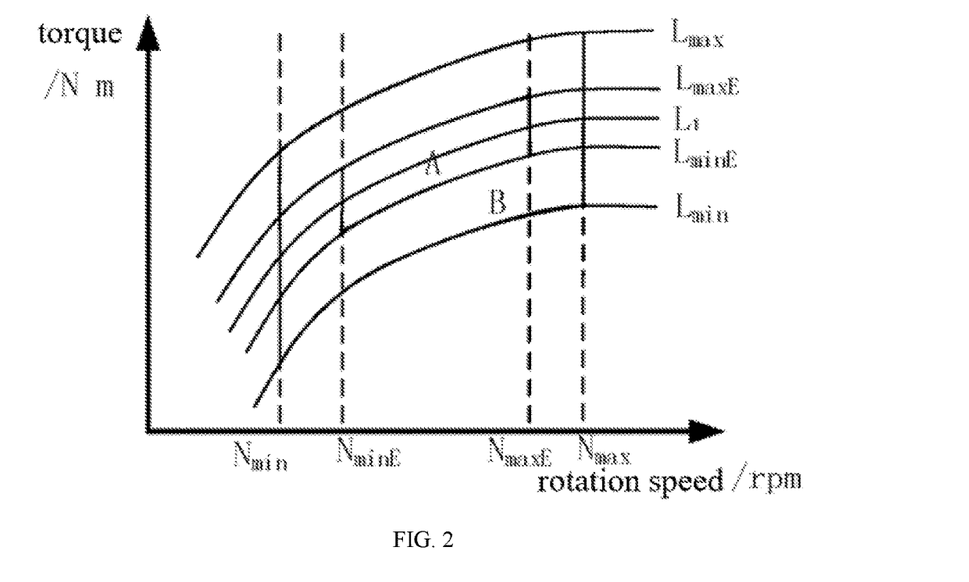
FIG. 2 is a diagram of the engine operating range of a embodiment of the present application.

FIG. 2 is a diagram showing the engine operating range. The above-mentioned condition 1 and condition 2 will be described in detail below with reference to FIG. 2.

The abscissa in FIG. 2 refers to the parallel rotation speed of the engine, and the ordinate refers to the parallel torque of the engine. $L_1$ refers to Optimal Operation Line (OOL) of the engine; $L_{max}$ refers to a parallel maximum operating torque curve; $L_{maxE}$ refers to a parallel maximum efficiency torque curve; $L_{min}$ refers to a parallel minimum operating torque curve; $L_{minE}$ refers to a parallel minimum efficiency torque curve; $N_{max}$ refers to a maximum parallel rotation speed; $N_{maxE}$ refers to a parallel maximum efficiency rotation speed; $N_{min}$ refers a parallel minimum speed; and $N_{minE}$ refers to a parallel minimum efficiency rotation speed. The maximum parallel rotation speed range $[N_{min}\text{-}N_{max}]$ and the maximum parallel torque range $[L_{min}, L_{max}]$ (the said $[L_{min}, L_{max}]$ refers to the maximum and minimum values in the $L_{min}$ and $L_{max}$ curves corresponding to $[N_{min}\text{-}N_{max}]$) represent region B in the figure (including region A in the middle). The said $[N_{min}\text{-}N_{max}]$ and the said $[L_{min}, L_{max}]$ are configured to respectively reflect the maximum rotation speed range and maximum torque range may be outputted when the engine is operating normally in parallel operation mode, And the parallel rotation speed operating range $[N_1\text{-}N_2]$ is less than the maximum parallel rotation speed range $[N_{min}\text{-}N_{max}]$, the parallel torque operating range $[L_1, L_2]$ is less than the maximum parallel torque range $[L_{min}, L_{max}]$, where, the region referred to by $[N_1\text{-}N_2]$ and $[L_1, L_2]$ is not shown in FIG. 2, it refers to a region in the region B which is a preset region.

In the following, the determination manner of the parallel rotation speed operating range and the parallel torque operating range, that is, the preset region, will be specifically described in a further preferred manner.

The parallel rotation speed range $[N_1\text{-}N_2]$ and the parallel torque range $[L_1, L_2]$ are determined according to the obtained temperature of the generator and/or the drive motor. Specifically, the higher the temperature of the generator and/or the drive motor, the larger the parallel rotation speed operating range $[N_1\text{-}N_2]$ and the parallel torque operating range $[L_1, L_2]$. As described with reference to FIG. 2, as the temperature of the generator and/or the drive motor increases, the parallel rotation speed operating range $[N_1\text{-}N_2]$ and the parallel torque operating range $[L_1, L_2]$ gradually approach to the maximum parallel rotation speed range $[N_{min}\text{-}N_{max}]$ and the maximum parallel torque range $[L_{min}, L_{max}]$.

In the following, the determination manner of the parallel rotation speed operating range $[N_1\text{-}N_2]$ and the parallel torque operating range $[L_1, L_2]$ will be specifically described in a further preferred manner.

As shown in FIG. 2, the step of determining the parallel rotation speed operating range $[N_1\text{-}N_2]$ and its corresponding parallel torque operating range $[L_1, L_2]$ according to the temperature of the generator and/or the drive motor includes: correcting the parallel rotation speed operating efficiency range $[N_{minE}, N_{maxE}]$ and its corresponding parallel torque operating efficiency range $[L_{minE}, L_{maxE}]$ (corresponding to region A in FIG. 2) according to the real-time temperature of the generator and/or the drive motor, so that the parallel rotation speed operating efficiency range $[N_1\text{-}N_2]$ and its corresponding parallel torque operating efficiency range $[L_1, L_2]$ is obtained.

The the parallel rotation speed operating efficiency range $[N_{minE}, N_{maxE}]$ and its corresponding parallel torque operating efficiency range $[L_{minE}, L_{maxE}]$ are configured to be obtained when the engine is operating below a safety temperature threshold, and the parallel rotation speed operating range $[N_1\text{-}N_2]$ and its corresponding parallel torque operating range $[L_1, L_2]$ are configured to expand as the temperature of the generator and/or the drive motor increases. Certainly, the said $[N_1\text{-}N_2]$ and its corresponding $[L_1, L_2]$ may only reach the range of the said $[N_{min}\text{-}N_{max}]$ and $[L_{min}, L_{max}]$, that is, the edge the region B in the figure.

In the above manner, the conditions for entering the parallel operation mode will be corrected according to the temperature of the generator and/or the drive motor, so that the adjustment of the vehicle load distribution is accomplished on the basis of ensuring that the engine can operate efficiently, and the performance safety of the generator and/or the drive motor is ensured.

Figure 3:
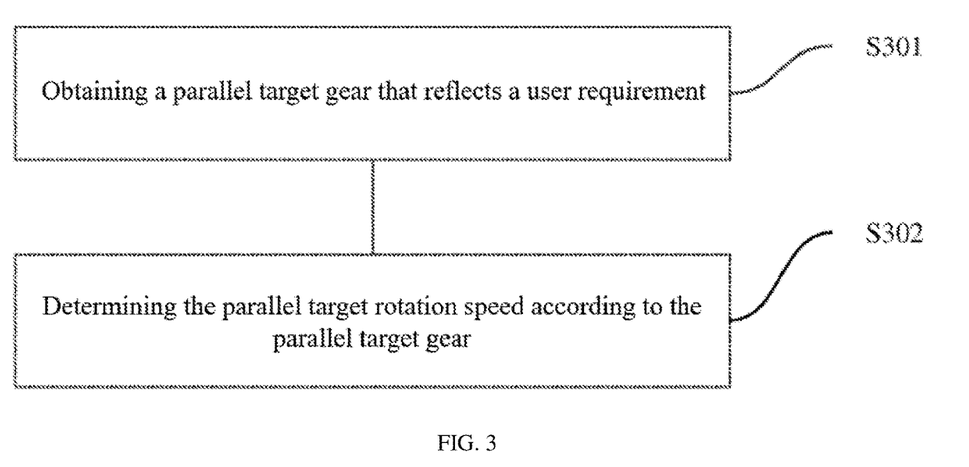
FIG. 3 is a flowchart of a method for obtaining a parallel target rotation speed of the engine according to a embodiment of the present application.

Further preferably, FIG. 3 is a flowchart of a method for obtaining a parallel target rotation speed of the engine according to the present application, as shown in FIG. 3, the method for obtaining the parallel target rotation speed of the engine includes: steps S301-S302.

in step S301, a parallel target gear that reflects a user requirement is obtained; and in step S302, the parallel target rotation speed is determined according to the parallel target gear.

Figure 4:
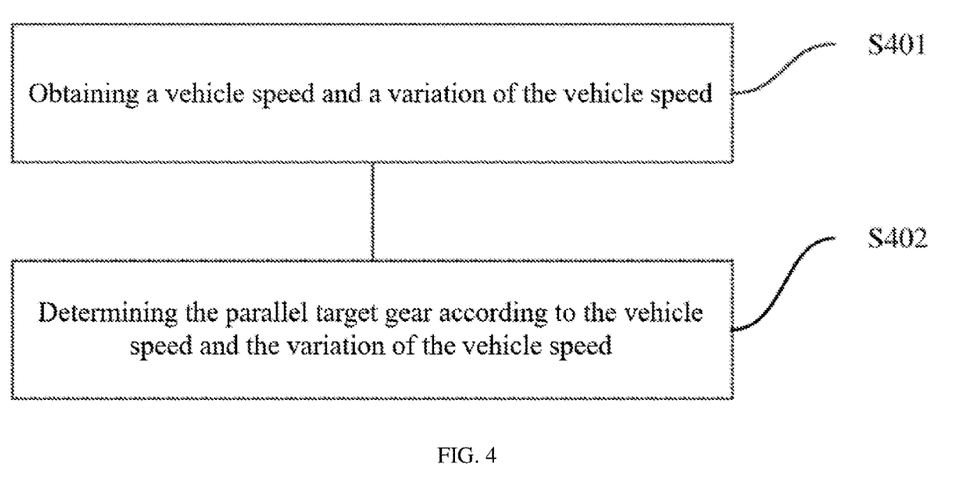
FIG. 4 is a flowchart of a method for obtaining the parallel target gear reflecting user requirements according to the present application.

The parallel target gear as described in the step of S301 is determined by the vehicle speed. Preferably, FIG. 4 is a flowchart of a method for obtaining the parallel target gear reflecting user requirements, as shown in FIG. 4, the method for obtaining parallel target gear reflecting user requirements includes: steps S401-S402.

in step S401, a vehicle speed and a variation of the vehicle speed are obtained; and in step S402, the parallel target gear is determined according to the vehicle speed and the variation of the vehicle speed.

Specifically, the determination of the first and second gear is taken as examples. When the vehicle speed variation shows that the vehicle speed is increased from high to low and the vehicle speed is greater than a first vehicle speed threshold, determining the first gear as the parallel target gear; when the vehicle speed variation shows that the vehicle speed is from low to high and the vehicle speed is greater than the second vehicle speed threshold, determining the second gear as the parallel target gear.

In the step of S302, the target rotation speed can be calculated based on the following formula:

parallel target rotation speed=vehicle speed*transmission ratio;

where, the transmission ratio is configured to be associated with the parallel target gear. Specifically, each parallel target gear corresponds to a transmission ratio.

Further preferably, after the step of activating the parallel operation mode of the hybrid vehicle, the vehicle drive control method further includes: controlling the hybrid vehicle to adjust a load distribution of the engine, the generator, and the drive motor under the parallel operation mode. The distribution adjustment is a way to restore the operating performance of the generator and/or the drive motor to a normal state, which can avoid performance degradation or breakdown of the generator and/or the drive motor.

Further preferably, the step of controlling the hybrid vehicle to adjust the load distribution under the parallel operation mode includes: controlling a total workload of the hybrid vehicle remains unchanged under the parallel operation mode, and lowering the workload of the generator and/or the drive motor.

The workload of the generator and/or the drive motor may also be referred to as output power. The load point of the generator and/or the drive motor is transferred through the parallel operation mode, so that the total workload of the generator and/or the drive motor of the hybrid vehicle remains unchanged, and thereby ensuring the performance safety of the generator and/or the drive motor without occurring over temperature fault.

Through the above embodiments, the load distribution of the vehicle can be corrected to reduce the working load of the generator and/or the drive motor which already being over temperature, so that the performance of the generator and/or the drive motor can be restored.

Figure 5:
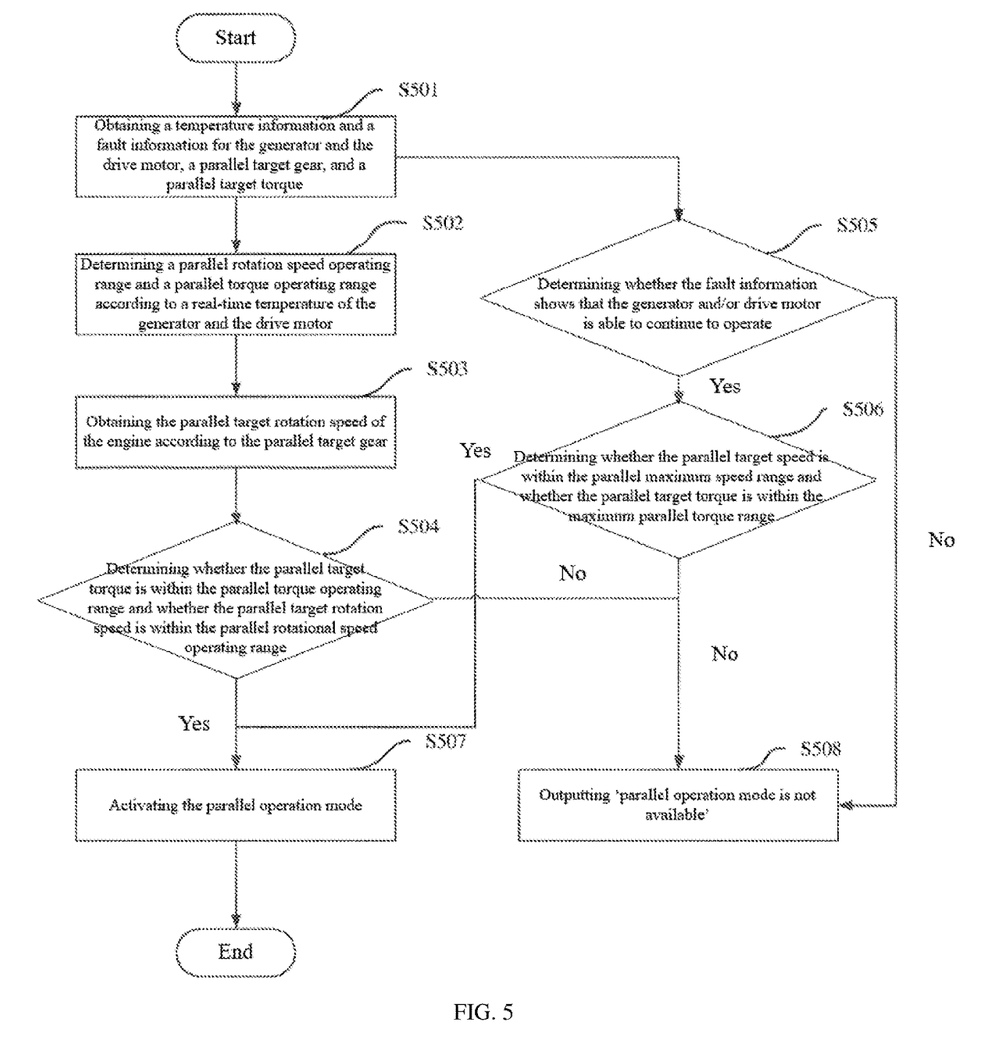
FIG. 5 is a flowchart for determining whether the hybrid vehicle meets the activation method of the parallel operation mode according to the present application.

FIG. 5 is a flowchart for determining whether the hybrid vehicle meets the activation method of the parallel operation mode according to the present application, as shown in FIG. 5, the activation method of the parallel operation mode includes: steps S501-S507.

in step S501, a temperature information and a fault information for the generator and the drive motor, a parallel target gear and a parallel target torque are obtained;

in step S502, a parallel rotation speed operating range and the parallel torque operating range are determined according to the real-time temperature of the generator and the drive motor;

in step S503, the parallel target rotation speed of the engine is obtained according to the parallel target gear;

in step S504, it is determined whether the parallel target torque is within the parallel torque operating range and whether the parallel target rotation speed is within the parallel rotational speed operating range;

in step S505, the fault information is analyzed, and it is determined whether the fault information shows that the generator and/or the drive motor is able to continue to operate;

in step S506, it is determined whether the parallel target speed is within the parallel maximum speed range and whether the parallel target torque is within the maximum parallel torque range when the fault information shows that the generator and/or the drive motor is not able to continue to operate;

in step S507, the parallel operation mode is activated when the determination result of step S504 is yes or the determination result of step S506 is yes;

in step S503, outputting 'parallel operation mode is not available' if any of the determination result of step S504, the determination result of step S505, or the determination result of step S506 is no.

The vehicle can be driven under the parallel operation mode when the parallel operation mode is activated, and the said parallel operation mode is unavailable means it is unable to switch to the parallel operation mode.

In addition, the present application further provides a vehicle drive control system, wherein the vehicle drive control system is configured with a controller for executing the above vehicle drive control method.

In other embodiments, the vehicle drive control system includes a processor and a memory, the execution step of the vehicle drive control method is stored in the memory as a program unit, and the processor executes the program unit stored in the memory to implement the corresponding functions.

The processor contains a kernel, and the kernel calls the corresponding program unit from the memory. The kernel can be set to one or more, and the control of the vehicle drive can be realized by adjusting the kernel parameters.

The memory may include non-permanent memory in computer-readable medium, random access memory (RAM) and/or non-volatile memory, such as read-only memory (ROM) or flash memory (flash RAM), and the memory includes at least one memory chip.

An embodiment of the present application provides a machine readable storage medium on which computer program instructions are stored, wherein the computer program instructions is configured to make a machine to execute the above vehicle drive control method.

An embodiment of the present application provides a processor for executing a program, wherein the vehicle drive control method is performed when the program is executed.

The present application further provides a computer program product that, when executed on a data processing device, is adapted to execute a program for initializing the vehicle drive control method steps described in Embodiment 1.

Those skilled in the art should understand that the embodiments of the present application may be provided as a method, a system, or a computer program product. Therefore, the present application may take the form of an entirely hardware embodiment, an entirely software embodiment, or an embodiment combining software and hardware. Moreover, the present application may take the form of a computer program product implemented on one or more computer-usable storage media (including but not limited to disk memories, CD-ROMs, and optical memories) containing computer-usable program codes.

The present application is described with reference to flowcharts and/or block diagrams of methods, devices (systems), and computer program products according to embodiments of the present application. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, special-purpose computer, embedded processor, or other programmable data processing device to produce a machine, so that the instructions generated by the processor of the computer or other programmable data processing device are used to generate means for implementing the functions specified in one or more flowcharts and/or one or more blocks of the block diagrams.

These computer program instructions may also be stored in a computer-readable memory capable of directing a computer or other programmable data processing device to operate in a specific manner such that the instructions stored in the computer-readable memory produce a manufactured article including an instruction device, the instructions device implements the functions specified in one or more flowcharts and/or one or more blocks of the block diagram.

These computer program instructions can also be loaded onto a computer or other programmable data processing device, so that a series of operating steps can be performed on the computer or other programmable device to produce a computer-implemented process, which can be executed on the computer or other programmable device. The instructions executed on the computer or other programmable device provide steps for implementing the functions specified in one or more flowcharts and/or one or more blocks of the block diagrams.

In a typical configuration, a computing device includes one or more processors (CPU), input/output interfaces, network interfaces, and memories.

The memory may include non-permanent memory, random access memory (RAM), and/or non-volatile memory in the computer-readable media, such as read-only memory (ROM) or flash memory (flash RAM). Memory is an example of a computer-readable medium.

Computer-readable media includes permanent and non-persistent, removable and non-removable media. Information storage can be accomplished by any method or technology. Information may be computer-readable instructions, data structures, modules of a program, or other data. Examples of computer storage media include, but are not limited to, a phase change random access memory (PRAM), a static random access memory (SRAM), a dynamic random access memory (DRAM), other types of random access memory (RAM), and read-only memory (ROM), electrically erasable programmable read-only memory (EEPROM), flash memory or other memory technologies, read-only disc read-only memory (CD-ROM), digital versatile disc (DVD) or other optical storage, magnetic tape cartridges, magnetic tape storage or other magnetic storage devices or any other non-transmitting medium may be used to store information that can be accessed by a computing device. As defined herein, computer-readable medium does not include temporary computer-readable media (transitory media), such as modulated data signals and carrier waves.

It should also be noted that the terms "including", "comprising" or any other variants thereof are intended to cover non-exclusive inclusion, so that a process, method, product or device that includes a series of elements includes not only those elements but also other elements not explicitly listed, or those that are inherent to such a process, method, product, or device. Without limitation, the elements defined by the sentence "comprising a . . . " do not exclude that there are other identical elements in the process, method, product or equipment including the elements.

The above are only examples of the present application and are not intended to limit the present application. For those skilled in the art, the present application may have various modifications and changes. Any modification, equivalent replacement, and improvement made within the spirit and principle of the present application shall be included in the scope of claims of the present application.

What is claimed is:

1. A vehicle drive control method, being applied to a vehicle controller, comprising:
   obtaining a performance-related information of a generator and/or a drive motor of a hybrid vehicle;
   determining whether the hybrid vehicle meets activation conditions of a parallel operation mode when the performance-related information shows that an operating performance of the generator and/or the drive motor degrades; and
   activating the parallel operation mode of the hybrid vehicle when the hybrid vehicle meets the activation conditions of the parallel operation mode, so that the operating performance of the generator and/or the drive motor is restored to a normal state,
   wherein, when the generator and/or the drive motor operates in the normal state, the generator and/or the drive motor is configured to respectively reflect a parallel rotation speed operating range which is less than a maximum parallel rotation speed range, and a parallel torque operating range which is less than a maximum parallel torque range, and
   wherein the activation of the parallel operation mode is determined according to the following conditions:
   obtaining a temperature information and a fault information for the generator and the drive motor, a parallel target gear, and a parallel target torque;
   determining a parallel rotation speed operating range and a parallel torque operating range according to a real-time temperature of the generator and/or the drive motor;
   obtaining the parallel target rotation speed of the the generator and/or the drive motor according to the parallel target gear;
   determining whether the parallel target torque is within the parallel torque operating range and whether the parallel target rotation speed is within the parallel rotational speed operating range, so that a first determination result is obtained;
   analyzing the fault information, and determining whether the fault information shows that the generator and/or drive motor is able to continue to operate, so that a second determination result is obtained;
   determining whether the parallel target speed is within the parallel maximum speed range and whether the parallel target torque is within the maximum parallel torque range when the fault information shows that the generator and/or drive motor fails to continue to operate, so that a third determination result is obtained;
   activating the parallel operation mode when the first determination result is yes or the third determination result is yes; and
   outputting a message that the parallel operation mode is not available when any of the first determination result, the second determination result, or the third determination result is no.

2. The vehicle drive control method according to claim 1, wherein the activation conditions of the parallel operation mode comprises:
   the parallel target rotation speed of an engine being within a preset parallel rotation speed operating range, and the parallel target torque of the hybrid vehicle being within a parallel torque operating range corresponding to the parallel target rotation speed; or
   the fault information showing that the generator and/or the drive motor fail to continue to operate, and the parallel target rotation speed of the engine is within the maximum parallel rotation speed range and the parallel target torque is within the maximum parallel torque range.

3. The vehicle drive control method according to claim 2, further comprising:
   determining the parallel rotation speed operating range and a corresponding parallel torque operating range according to the real-time temperature of the generator and/or the drive motor.

4. The vehicle drive control method according to claim 3, wherein the step of determining the parallel rotation speed operating range and the corresponding parallel torque operating range according to the real-time temperature of the generator and/or the drive motor comprises:
   correcting a parallel rotation speed operating efficiency range and a corresponding parallel torque operating efficiency range according to the real-time temperature of the generator and/or the drive motor, so that the parallel rotation speed operating range and the corresponding parallel torque operating range are obtained;
   wherein, the parallel rotation speed operating efficiency range and the corresponding parallel torque operating efficiency range are configured to be obtained when the generator and/or the drive motor is operating below a safety temperature threshold, and the parallel rotation speed operating range and the corresponding parallel torque operating range are configured to expand as the real-time temperature of the generator and/or the drive motor increases.

5. The vehicle drive control method according to claim 2, wherein further comprising:
obtaining a parallel target gear that reflects a user requirement; and
determining the parallel target rotation speed according to the parallel target gear.

6. The vehicle drive control method according to claim 5, wherein the step of determining the parallel target rotation speed according to the parallel target gear is based on the following formula:
parallel target rotation speed =vehicle speed * transmission ratio;
wherein the transmission ratio is associated with the parallel target gear.

7. The vehicle drive control method according to claim 1, after the step of activating the parallel operation mode of the hybrid vehicle, further comprising:
controlling the hybrid vehicle to adjust a load distribution of the generator and/or the drive motor under the parallel operation mode.

8. The vehicle drive control method according to claim 7, wherein the step of controlling the hybrid vehicle to adjust the load distribution under the parallel operation mode comprises:
controlling a total workload of the hybrid vehicle to remain unchanged under the parallel operation mode, and lowering a workload of the generator and/or the drive motor.

9. A vehicle drive control system, comprising:
a controller, including a processor, configured for:
obtaining a performance-related information of a generator and/or a drive motor of a hybrid vehicle;
determining whether the hybrid vehicle meets activation conditions of a parallel operation mode when the performance-related information shows that an operating performance of the generator and/or the drive motor degrades; and
activating the parallel operation mode of the hybrid vehicle when the hybrid vehicle meets the activation conditions of the parallel operation mode, so that the operating performance of the generator and/or the drive motor is restored to a normal state,
wherein, when the generator and/or the drive motor operates in the normal state, the generator and/or the drive motor is configured to respectively reflect a parallel rotation speed operating range is less than a maximum parallel rotation speed range, and a parallel torque operating range is less than a maximum parallel torque range, and wherein the activation of the parallel operation mode is determined according to the following conditions:
obtaining a temperature information and a fault information for the generator and the drive motor, a parallel target gear, and a parallel target torque;
determining a parallel rotation speed operating range and a parallel torque operating range according to a real-time temperature of the generator and/or the drive motor;
obtaining the parallel target rotation speed of the generator and/or the drive motor according to the parallel target gear;

determining whether the parallel target torque is within the parallel torque operating range and whether the parallel target rotation speed is within the parallel rotational speed operating range, so that a first determination result is obtained;
analyzing the fault information, and determining whether the fault information shows that the generator and/or drive motor is able to continue to operate, so that a second determination result is obtained;
determining whether the parallel target speed is within the parallel maximum speed range and whether the parallel target torque is within the maximum parallel torque range when the fault information shows that the generator and/or drive motor fails to continue to operate, so that a third determination result is obtained;
activating the parallel operation mode when the first determination result is yes or the third determination result is yes; and
outputting a message that the parallel operation mode is not available when any of the first determination result, the second determination result, or the third determination result is no.

10. A non-transitory computer-readable storage medium on which computer program instructions are stored, wherein the instructions are configured to cause a processor to execute the following operations:
obtaining a performance-related information of a generator and/or a drive motor of a hybrid vehicle;
determining whether the hybrid vehicle meets activation conditions of a parallel operation mode when the performance-related information shows that an operating performance of the generator and/or the drive motor degrades; and
activating the parallel operation mode of the hybrid vehicle when the hybrid vehicle meets the activation conditions of the parallel operation mode, so that the operating performance of the generator and/or the drive motor is restored to a normal state,
wherein, when the generator and/or the drive motor operates in the normal state, the generator and/or the drive motor is configured to respectively reflect a parallel rotation speed operating range is less than a maximum parallel rotation speed range, and a parallel torque operating range is less than a maximum parallel torque range,
wherein the activation of the parallel operation mode is determined according to the following conditions:
obtaining a temperature information and a fault information for the generator and the drive motor, a parallel target gear, and a parallel target torque;
determining a parallel rotation speed operating range and a parallel torque operating range according to a real-time temperature of the generator and/or the drive motor;
obtaining the parallel target rotation speed of the generator and/or the drive motor according to the parallel target gear;
determining whether the parallel target torque is within the parallel torque operating range and whether the parallel target rotation speed is within the parallel rotational speed operating range, so that a first determination result is obtained;
analyzing the fault information, and determining whether the fault information shows that the generator and/or drive motor is able to continue to operate, so that a second determination result is obtained;

determining whether the parallel target speed is within the parallel maximum speed range and whether the parallel target torque is within the maximum parallel torque range when the fault information shows that the generator and/or drive motor fails to continue to operate, so that a third determination result is obtained;

activating the parallel operation mode when the first determination result is yes or the third determination result is yes; and outputting a message that the parallel operation mode is not available when any of the first determination result, the second determination result, or the third determination result is no.

11. The non-transitory computer-readable storage medium according to claim 10, wherein the activation conditions of the parallel operation mode comprises:

the parallel target rotation speed of an engine being within a preset parallel rotation speed operating range, and the parallel target torque of the hybrid vehicle being within a parallel torque operating range corresponding to the parallel target rotation speed; or the fault information showing that the generator and/or the drive motor fail to continue to operate, and the parallel target rotation speed of the engine is within the maximum parallel rotation speed range and the parallel target torque is within the maximum parallel torque range.

12. The non-transitory computer-readable storage medium according to claim 11, wherein the operations further comprises:

determining the parallel rotation speed operating range and a corresponding parallel torque operating range according to the real-time temperature of the generator and/or the drive motor.

13. The non-transitory computer-readable storage medium according to claim 12, wherein the step of determining the parallel rotation speed operating range and the corresponding parallel torque operating range according to the real-time temperature of the generator and/or the drive motor comprises:

correcting a parallel rotation speed operating efficiency range and a corresponding parallel torque operating efficiency range according to the real-time temperature of the generator and/or the drive motor, so that the parallel rotation speed operating range and the corresponding parallel torque operating range are obtained;

wherein, the parallel rotation speed operating efficiency range and the corresponding parallel torque operating efficiency range are configured to be obtained when the engine is operating below a safety temperature threshold, and the parallel rotation speed operating range and the corresponding parallel torque operating range are configured to expand as the temperature of the generator and/or the drive motor increases.

14. The non-transitory computer-readable storage medium according to claim 11, wherein the operations further comprise:

obtaining a parallel target gear that reflects a user requirement; and determining the parallel target rotation speed according to the parallel target gear.

15. The non-transitory computer-readable storage medium according to claim 14, wherein the step of determining the parallel target rotation speed according to the parallel target gear is based on the following formula:

parallel target rotation speed =vehicle speed * transmission ratio;

wherein the transmission ratio is associated with the parallel target gear.

16. The non-transitory computer-readable storage medium according to claim 10, after the step of activating the parallel operation mode of the hybrid vehicle, further comprising:

controlling the hybrid vehicle to adjust a load distribution of the generator and/or the drive motor under the parallel operation mode.

17. The non-transitory computer-readable storage medium according to claim 16, wherein the step of controlling the hybrid vehicle to adjust the load distribution under the parallel operation mode comprises:

controlling a total workload of the hybrid vehicle to remain unchanged under the parallel operation mode, and lowering a workload of the generator and/or the drive motor.

* * * * *

UNITED STATES PATENT AND TRADEMARK OFFICE
CERTIFICATE OF CORRECTION

| | | |
|---|---|---|
| PATENT NO. | : 12,012,093 B2 | |
| APPLICATION NO. | : 17/790476 | |
| DATED | : June 18, 2024 | |
| INVENTOR(S) | : Yunfei Li and Zhiqiang Li | |

It is certified that error appears in the above-identified patent and that said Letters Patent is hereby corrected as shown below:

In the Claims

Claim 10, Column 12, Line 24, please delete the phrase "computer program".

Signed and Sealed this
Thirtieth Day of July, 2024

Katherine Kelly Vidal
*Director of the United States Patent and Trademark Office*